United States Patent
Suzuki

(10) Patent No.: US 10,475,342 B2
(45) Date of Patent: Nov. 12, 2019

(54) PARKING LOT EVALUATION APPARATUS, PARKING LOT INFORMATION SUPPLY METHOD, AND DATA STRUCTURE OF PARKING LOT INFORMATION

(71) Applicant: TOYOTA JIDOSHA KABUSHIKI KAISHA, Toyota-shi, Aichi-ken (JP)

(72) Inventor: Keiko Suzuki, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/199,731

(22) Filed: Nov. 26, 2018

(65) Prior Publication Data
US 2019/0180619 A1    Jun. 13, 2019

(30) Foreign Application Priority Data
Dec. 13, 2017 (JP) ................ 2017-238988

(51) Int. Cl.
| | |
|---|---|
| G08G 1/14 | (2006.01) |
| B60W 40/08 | (2012.01) |
| G10L 15/22 | (2006.01) |
| G06F 3/16 | (2006.01) |
| G07C 5/00 | (2006.01) |
| G10L 15/18 | (2013.01) |

(52) U.S. Cl.
CPC ............ *G08G 1/143* (2013.01); *B60W 40/08* (2013.01); *G06F 3/167* (2013.01); *G07C 5/008* (2013.01); *G10L 15/1822* (2013.01); *G10L 15/22* (2013.01); *B60W 2040/089* (2013.01); *G10L 2015/228* (2013.01)

(58) Field of Classification Search
CPC . B60W 2040/089; B60W 40/08; G06F 3/167; G10L 15/1822; G10L 15/22; G08G 1/143
USPC ....................................... 340/932.2
See application file for complete search history.

(56) References Cited

U.S. PATENT DOCUMENTS

| | | | | |
|---|---|---|---|---|
| 8,063,797 B1* | 11/2011 | Sonnabend | ........ | G06K 9/00791 340/932.2 |
| 2016/0046285 A1* | 2/2016 | Kim | ...................... | G08G 1/133 340/932.2 |

FOREIGN PATENT DOCUMENTS

| | | | |
|---|---|---|---|
| JP | 2009-115679 A | 5/2009 | |
| JP | 2015-064584 A | 4/2015 | |

* cited by examiner

*Primary Examiner* — Eric Blount
(74) *Attorney, Agent, or Firm* — Oliff PLC

(57) ABSTRACT

A parking lot evaluation apparatus includes: an acquisition device configured to acquire information on an utterance made by a driver about a parking lot in a vehicle; and a deriving device configured to derive a parking difficulty level indicative of parking difficulty at the parking lot, based on the acquired utterance information about the parking lot. The acquisition device acquires, as an utterance about the parking lot, an utterance of the driver about the parking lot at the time when the vehicle is placed in the parking lot or around the parking lot.

11 Claims, 4 Drawing Sheets

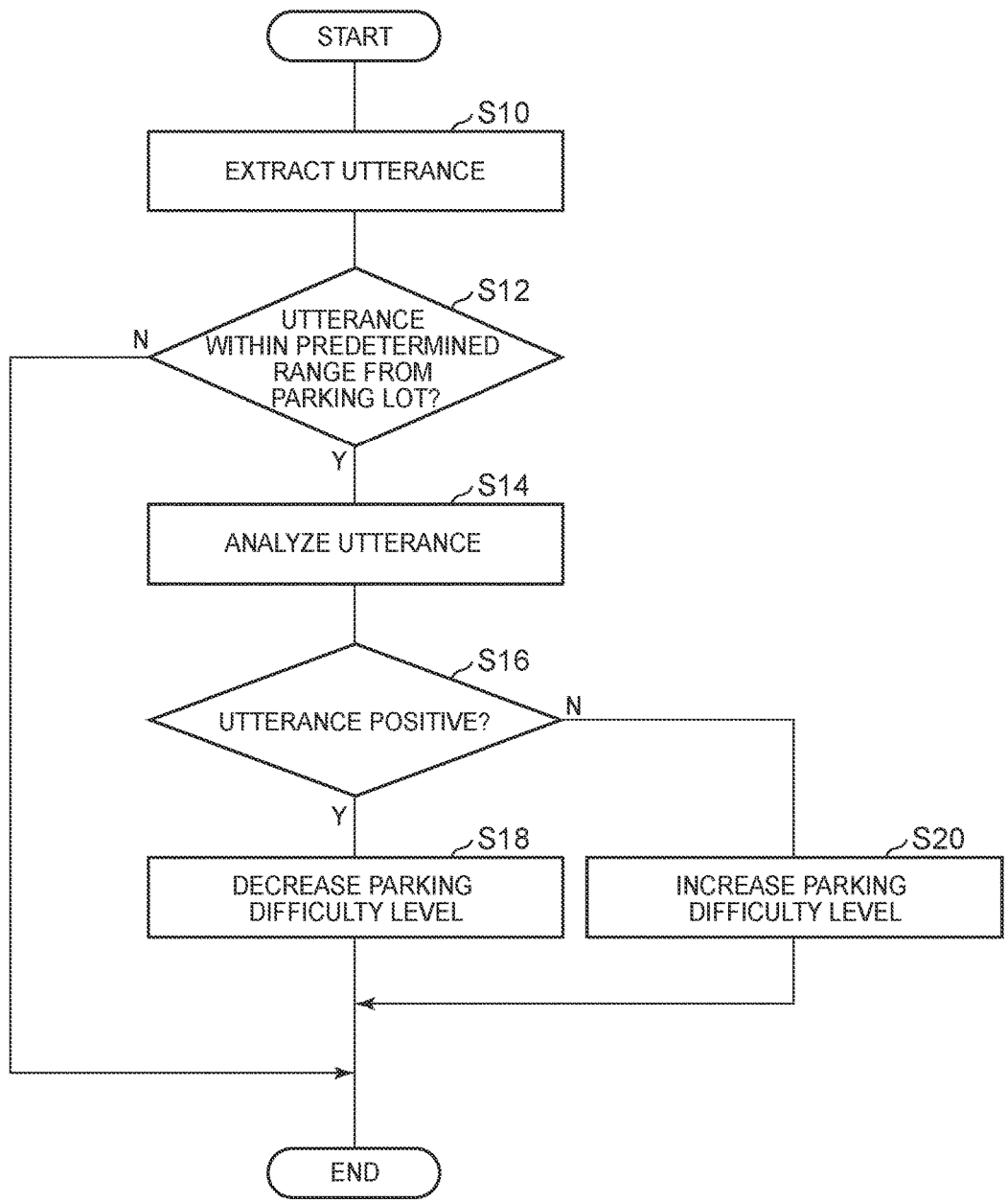

PARKING LOT EVALUATION APPARATUS, PARKING LOT INFORMATION SUPPLY METHOD, AND DATA STRUCTURE OF PARKING LOT INFORMATION

INCORPORATION BY REFERENCE

The disclosure of Japanese Patent Application No. 2017-238988 filed on Dec. 13, 2017 including the specification, drawings and abstract is incorporated herein by reference in its entirety.

BACKGROUND

1. Technical Field

The disclosure relates to a parking lot evaluation apparatus, a parking lot information supply method, and a data structure of parking lot information.

2. Description of Related Art

Japanese Unexamined Patent Application Publication No. 2009-115679 (JP 2009-115679 A) describes an in-vehicle navigation apparatus configured such that an excess width of a parking space taken by a camera of a host vehicle at the time of parking in a parking lot and the number of times of use of a back-gear of the host vehicle at the time of parking are stored, and when a driver performs a parking-lot search, the excess width of the parking space and the number of times of use of the back-gear are displayed as a parking-lot search result.

SUMMARY

In the technique described in JP 2009-115679 A, at the time of a parking-lot search, the number of times of use of the back-gear at the time of parking, and the like are acquired from past drive data of the host vehicle as information indicative of a difficulty level of a parking space. However, even if a parking lot where the host vehicle is never parked is searched, information indicative of a difficulty level of a parking space cannot be acquired.

The disclosure provides a technique to collect useful information about a parking lot from a plurality of vehicles and to derive information indicative of parking difficulty at the parking lot.

An aspect of the disclosure relates to a parking lot evaluation apparatus related to a vehicle that a driver drives. The parking lot evaluation apparatus includes an acquisition device and a deriving device. The acquisition device is configured to acquire utterance information that is information on an utterance made by the driver about a parking lot in the vehicle, and the acquisition device is configured to acquire, as an utterance about the parking lot, an utterance of the driver about the parking lot at the time when the vehicle is placed in the parking lot or around the parking lot. The deriving device is configured to derive a parking difficulty level indicative of parking difficulty at the parking lot, based on the acquired utterance information about the parking lot.

With this aspect, by deriving the parking difficulty level of the parking lot from the utterance of the driver about the parking lot, it is possible to evaluate parking difficulty at the parking lot based on the subjective of the driver. Further, utterances made not only in the parking lot but also around the parking lot are taken as evaluation targets. Accordingly, an utterance made when a user avoids parking at the parking lot can be used to derive parking difficulty at the parking lot.

In the parking lot evaluation apparatus, the acquisition device may be configured to store the utterance of the driver about the parking lot in association with attribute information of the vehicle that the driver drives, and the deriving device may be configured to derive the parking difficulty level according to the attribute information of the vehicle. Hereby, the size of the vehicle, indicated by the attribute information of the vehicle, can be reflected on the parking difficulty level.

In the parking lot evaluation apparatus, the deriving device may be configured to categorize whether the utterance information of the driver about the parking lot is negative or positive, and the deriving device may be configured to derive the parking difficulty level based on the categorized utterance information about the parking lot. Hereby, the parking difficulty level can be easily derived from the utterance of the driver about the parking lot.

The parking lot evaluation apparatus may further include a skill calculating device configured to calculate a parking skill value of the driver based on vehicle state information including a driving operation history in the parking lot, the driving operation history being detected when the vehicle is parked. The deriving device may be configured to derive the parking difficulty level based on the utterance information of the driver about the parking lot and the parking skill value of the driver. Hereby, the parking skill value of the driver can be reflected on the parking difficulty level.

Another aspect of the disclosure relates to a parking lot information supply method to a driver of a vehicle. The parking lot information supply method includes: acquiring utterance information about a parking lot among utterances made in the vehicle at the parking lot and information to specify the parking lot; and providing parking lot information derived based on the utterance information to the driver when the vehicle is guided to the parking lot.

With this aspect, by deriving the parking difficulty level of the parking lot from the utterance of the driver about the parking lot, it is possible to evaluate parking difficulty at the parking lot based on the subjective of the driver. Further, the driver can determine whether the driver parks the vehicle at the parking lot, based on the parking lot information provided to the driver.

The parking lot information supply method may further include deriving a parking difficulty level indicative of parking difficulty at the parking lot, based on the acquired utterance information about the parking lot. The parking lot information may be information indicative of the parking difficulty level. The parking lot information may be provided when the driver performs a parking-lot search. The utterance information may be an utterance made by the driver about the parking lot at a time when the vehicle is placed in the parking lot or around the parking lot.

The parking lot information supply method may further include, before the acquiring of the utterance information and the information to specify the parking lot, outputting audio to promote the driver to make an utterance about the parking lot at the time of parking. The parking lot information supply method may further include outputting audio to promote the driver to make an utterance about the parking lot, in a time period from a time at which parking is finished to a time at which a power source of the vehicle is turned off.

Further another aspect of the disclosure relates to a data structure of parking lot information for a parking lot evaluation apparatus related to a vehicle that a driver drives. The data structure may include information to specify a parking lot and language data associated with the information to specify the parking lot. The language data indicates utterance information about the parking lot among utterances made in the vehicle and acquired in the parking lot or around the parking lot. The information to specify the parking lot and the language data are used for the parking lot evaluation apparatus to perform a process of deriving a parking difficulty level. The parking difficulty level is information derived based on the utterance information about the parking lot and indicative of parking difficulty at the parking lot.

With this aspect, by deriving the parking difficulty level of the parking lot from the language data indicative of utterance information of the driver about the parking lot, it is possible to evaluate parking difficulty at the parking lot based on the subjective of the driver.

The data structure may further include attribute information of the vehicle associated with the utterance information. The attribute information of the vehicle may be used for the parking lot evaluation apparatus to perform a process of deriving the parking difficulty level based on the utterance information about the parking lot and the attribute information of the vehicle.

The data structure may further include vehicle state information including a driving operation history of the vehicle in the parking lot. The vehicle state information may be used for the parking lot evaluation apparatus to perform a process of calculating a parking skill value of the driver based on the vehicle state information and deriving the parking difficulty level based on the utterance information of the driver about the parking lot and the parking skill value of the driver.

The disclosure can provide a technique configured to collect useful information about a parking lot from a plurality of vehicles and to derive information indicative of parking difficulty at the parking lot.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flow chart to describe a process of deriving a parking difficulty level based on an utterance of a driver.

DETAILED DESCRIPTION OF EMBODIMENTS

Figure 1:
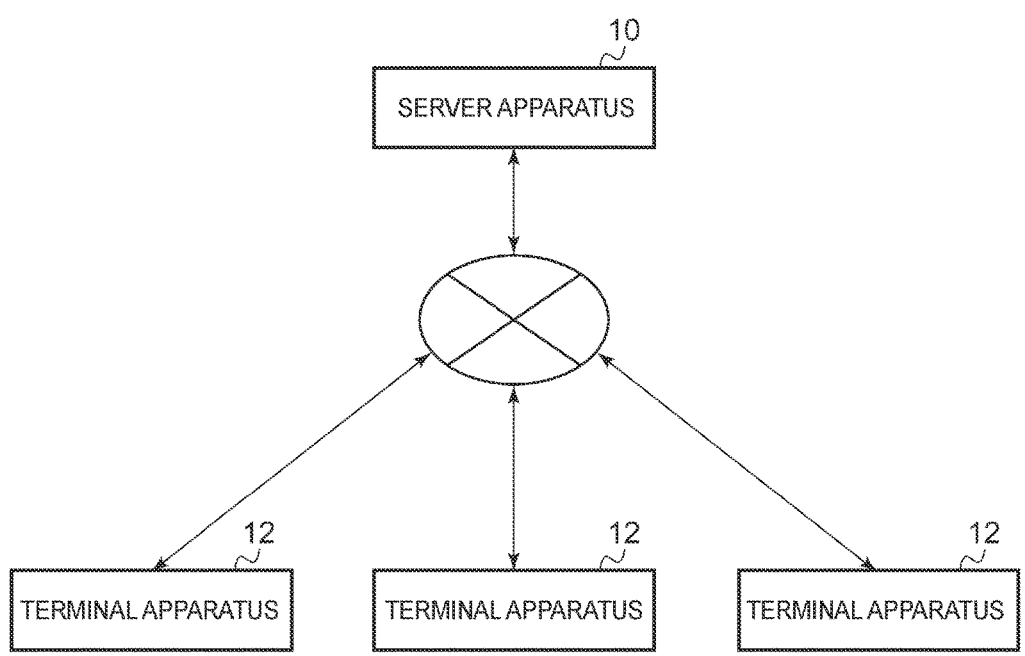
FIG. 1 is a schematic view illustrating a parking lot evaluation system.

FIG. 1 is a schematic view illustrating a parking lot evaluation system 1. The parking lot evaluation system 1 is constituted by a server apparatus 10 and a terminal apparatus 12. The server apparatus 10 and the terminal apparatus 12 are connected to each other via a network.

The terminal apparatus 12 is provided in a vehicle and transmits positional information of the vehicle and information on a vehicle state and sound in the vehicle to the server apparatus 10 periodically. Further, when a user performs a parking-lot search, the terminal apparatus 12 displays parking-lot search results to the user, including information indicative of a parking difficulty level, received from the server apparatus 10.

The server apparatus 10 collects information acquired in a plurality of vehicles from a plurality of terminal apparatuses 12 and derives a parking difficulty level indicative of parking difficulty at a parking lot based on the information thus collected. When the user performs a parking-lot search, the parking difficulty level thus derived is supplied to the user. At the time of deriving a parking difficulty level, the server apparatus 10 of the embodiment analyzes an utterance of a user about a parking lot. When the server apparatus 10 acquires a negative utterance such as "it seems hard to park" or "a passage in the parking lot is narrow", the server apparatus 10 increases the parking difficulty level. It is also conceivable that the parking difficulty level of the parking lot is derived from drive data at the time of parking. However, in this case, when a driver thinks it hard to park and steers a wheel carefully, drive data indicating that a vehicle is parked successfully may be collected eventually. By deriving a parking difficulty level of a parking lot based on an utterance of a user like the parking lot evaluation system 1, it is possible to reflect the subjective of the user on the parking difficulty level. Further, by deriving a parking difficulty level from an utterance of a user about a parking lot, parking difficulty at the parking lot can be evaluated even if the user does not park at the parking lot. That is, with the use of the technique of this disclosure, even when drive data at the time of parking is not acquired, parking difficulty at the parking lot can be evaluated.

The parking lot evaluation system 1 also functions as a parking lot information supply system by providing a derived parking difficulty level to a driver. For example, when the driver performs a parking-lot search, the parking lot information supply system supplies information indicative of parking difficulty at a parking lot to the driver. The information may be supplied at the time of guiding to the parking lot, e.g., at the time when the driver sets a facility with the parking lot as a destination in a navigation apparatus. The server apparatus 10 may function as a parking lot evaluation apparatus for deriving a parking difficulty level and may also function as a parking lot information supply apparatus for providing the parking difficulty level to the terminal apparatus 12.

Figure 2:
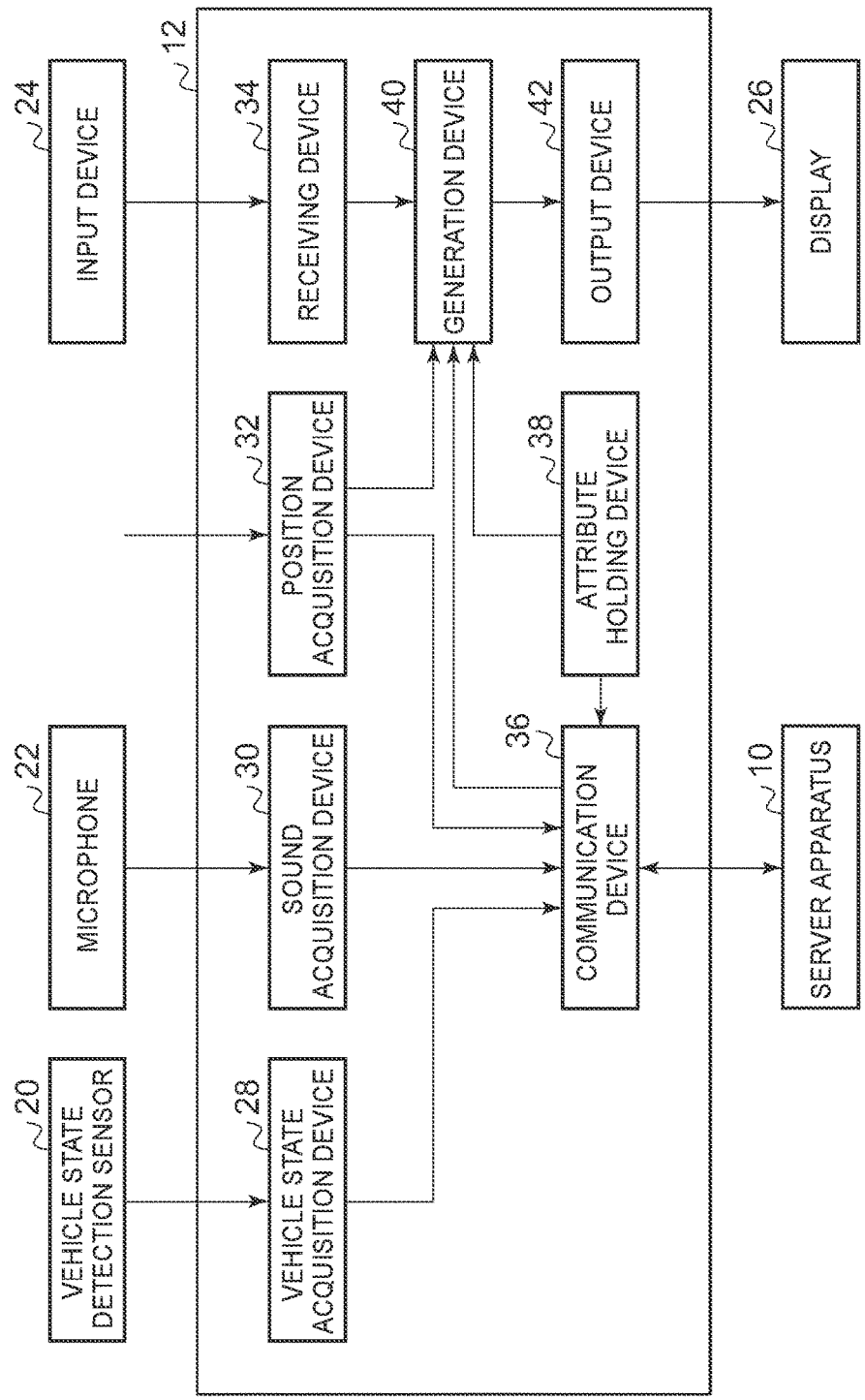
FIG. 2 is a view to describe a functional configuration of a terminal apparatus on a vehicle side.

FIG. 2 is a view to describe a functional configuration of the terminal apparatus 12 on the vehicle side. In FIG. 2, elements are described as functional blocks for performing various processes. The elements can include a circuit block, a memory, and other LSI in terms of hardware. Further, the elements are implemented by programs loaded in a memory in terms of software. Accordingly, these functional blocks can be implemented in various manners only by hardware, only by software, or by combinations thereof, and they are not limited to any manner. Further, similarly to the terminal apparatus 12, in terms of the server apparatus 10 as will be described below with reference to FIG. 3, its functional blocks are not limited to being constituted only by hardware or only by software.

The terminal apparatus 12 includes a vehicle state acquisition device 28, a sound acquisition device 30, a position acquisition device 32, a receiving device 34, a communication device 36, an attribute holding device 38, a generation device 40, and an output device 42. The vehicle state acquisition device 28 acquires vehicle state information from a vehicle state detection sensor 20. The vehicle state information mainly includes information to detect a turn-about maneuver of the vehicle. The vehicle state detection sensor 20 includes at least a sensor for detecting a position of a shift lever. The vehicle state detection sensor 20 may further include a sensor for detecting a running state.

Examples of the sensor for detecting a running state may be a sensor for detecting a steering amount of a steering wheel, a sensor for detecting an operation amount of an accelerator pedal, a sensor for detecting ON/OFF of an ignition switch, a sensor for detecting a vehicle speed, and the like.

The sound acquisition device 30 acquires sound information inside the vehicle via a microphone 22 provided in the vehicle. The microphone 22 can detect sound in the vehicle and detect utterances of an occupant. The position acquisition device 32 acquires positional information of the vehicle from the navigation apparatus and the like by use of a global positioning system (GPS).

The communication device 36 periodically transmits, to the server apparatus 10, the vehicle state information received from the vehicle state acquisition device 28, the sound information received from the sound acquisition device 30, and the positional information received from the position acquisition device 32. The vehicle state information also includes a driving operation history. When information is transmitted from the communication device 36 to the server apparatus 10, a terminal ID of the terminal apparatus 12 is also transmitted thereto. Further, when a user performs a parking-lot search, the communication device 36 receives information indicative of a parking difficulty level from the server apparatus 10. The information indicative of the parking difficulty level is used for display of parking-lot search results. When the communication device 36 transmits various information to the server apparatus 10, the communication device 36 may also transmit information indicative of attribute of the vehicle (hereinafter referred to as "attribute information") in addition. The attribute information is held in the attribute holding device 38. The attribute information is information indicative of a vehicle size and is sorted to a plurality of stages according to the vehicle size. The attribute information may include information indicative of a vehicle type.

The receiving device 34 receives an input of the user from an input device 24. The user inputs a search of parking lots around the vehicle, and the like into the input device 24, for example. The generation device 40 generates an image to be displayed on a display 26 according to the input of the user.

When the generation device 40 receives an input of the search of parking lots around the vehicle from the user, the generation device 40 receives various information from the server apparatus 10 and generates an image indicative of parking-lot search results. The various information includes positional information of a parking lot, a parking difficulty level of the parking lot, a parking skill value of a driver, and the like. For example, the generation device 40 generates an image of information indicative of a parking difficulty level as information about a parking lot. Further, the generation device 40 generates an image of a list showing a plurality of parking lots. The order of the parking lots in the list is set based on a distance from the vehicle to each parking lot and a parking difficulty level of each parking lot. When a parking difficulty level of a parking lot is high, that is, when it is hard to park at the parking lot, the generation device 40 puts the parking lot in the list so that the parking lot is not displayed at a high rank. Hereby, the user who performs a parking-lot search can avoid a parking lot where it is hard to park. Note that the display order of the parking lots is set not only based on their parking difficulty levels, but also in consideration of their distances from the position of the vehicle, and therefore, a parking lot with a high parking difficulty level may be displayed at a high rank.

Information indicative of a parking difficulty level may be displayed as information at three levels, i.e., "difficult," "normal," and "easy," and may be displayed as information at a plurality of levels (three levels or more). The generation device 40 may correct the parking difficulty level depending on a parking skill value of a driver. For example, in a case where the parking skill value of the driver is high, that is, in a case where the driver is good at parking, the generation device 40 may adjust the parking difficulty level to be lower. For example, the generation device 40 may display the parking difficulty level by changing it from "difficult" to "normal." Hereby, an appropriate parking difficulty level can be set according to the skill of the driver.

The generation device 40 may correct the parking difficulty level according to attribute information of the vehicle, held in the attribute holding device 38. The attribute holding device 38 holds attribute information indicative of the size of the vehicle. For example, when the attribute information indicates that the vehicle is large, the generation device 40 may adjust the parking difficulty level to be increased, so that the parking difficulty level indicative of "normal" is changed to "difficult." Hereby, an appropriate parking difficulty level can be set according to the size of the vehicle to drive.

When the parking difficulty level of a parking lot, corrected based on both of or either of the parking skill value and the attribute information, is a predetermined difficulty level or more, the generation device 40 may display information indicating that parking is impossible. Alternatively, a parking lot with a predetermined difficulty level or more may not be displayed. Hereby, it is possible not to recommend, to the driver, a parking lot where it seems difficult to park based on the parking skill of the driver and the type of the vehicle.

The generation device 40 generates an image indicative of parking-lot search results and sends it to the output device 42. The output device 42 outputs a received image to the display 26 so that the image is displayed. The user can check information indicative of the parking difficulty level and select a parking lot.

When the vehicle is placed in a parking lot or around a parking lot, the generation device 40 may output audio to promote the driver to make an utterance about the parking lot. The generation device 40 generates an image of a character and outputs audio that the character talks to the driver. When the generation device 40 detects that the vehicle is placed within a predetermined range from the parking lot, based on positional information of the parking lot and positional information of the vehicle, the generation device 40 outputs audio to ask the driver about the parking lot (e.g., "does it seem easy to park at the parking lot?") so as to promote the driver to make an utterance about the parking lot. Hereby, the utterance of the driver about the parking lot can be easily acquired.

The generation device 40 may output audio to promote the driver to make an utterance about the parking lot after parking is finished but before a power source of the vehicle is turned off. The generation device 40 acquires a state where the driver has finished parking from a detection result of the vehicle state detection sensor 20. The vehicle state detection sensor 20 detects completion of parking based on information indicative of the position of the shift lever or information indicative of ON/OFF of a parking brake. In a case where the driver has not made a sufficient utterance about the parking lot until the completion of parking, the generation device 40 outputs audio to promote the driver to make an utterance about the parking lot after parking is finished but before the power source of the vehicle is turned off. Hereby, the utterance of the driver about the parking lot can be easily acquired. In a case where the sound acquisition device 30 does not acquire any utterance indicative of parking difficulty at the parking lot until the completion of parking, or in a case where the user does not make any affirmative or negative utterance about the parking lot until the completion of parking, similar audio may be output.

Figure 3:
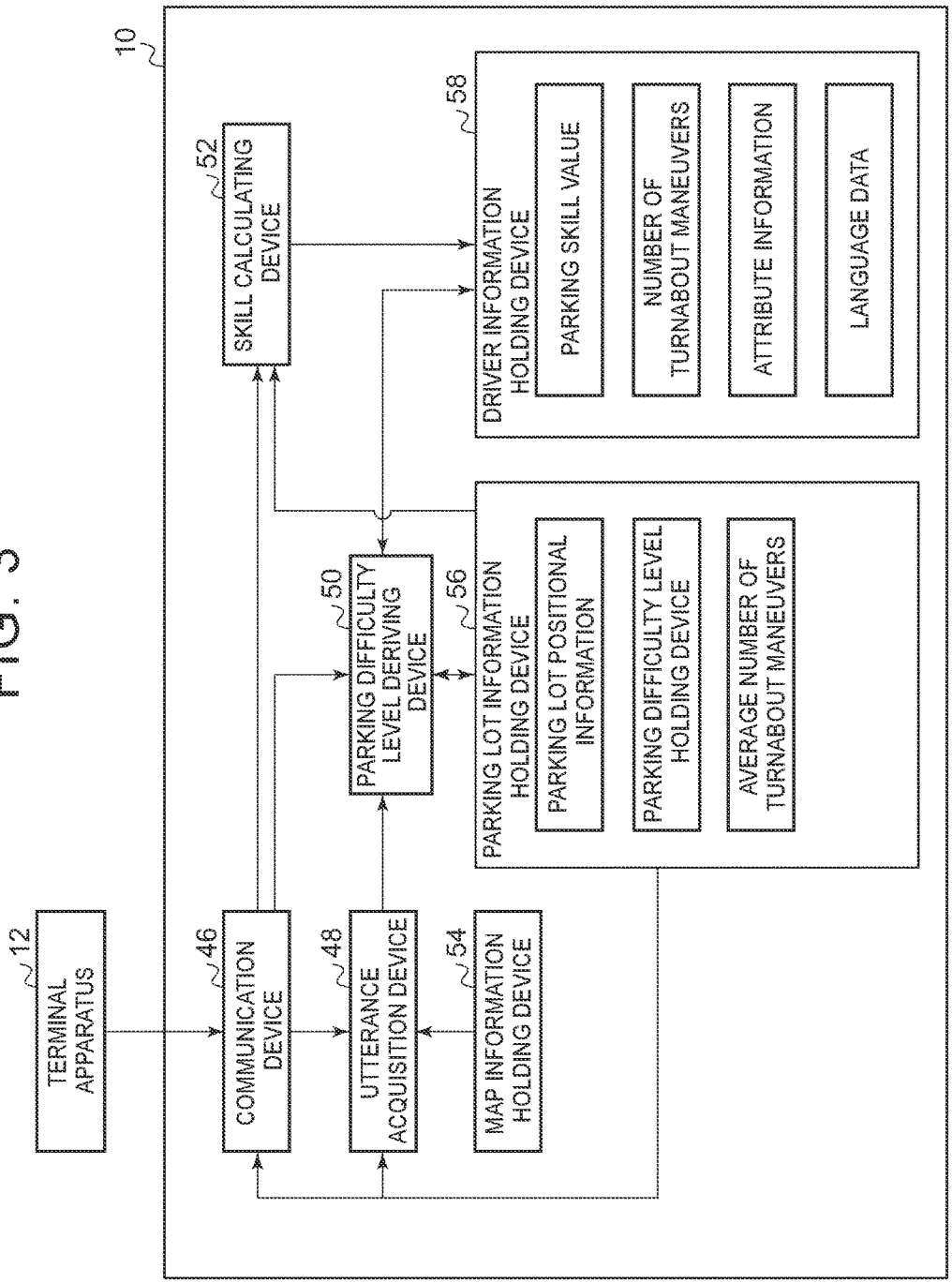
FIG. 3 is a view to describe a functional configuration of a server apparatus.

FIG. 3 is a view to describe a functional configuration of the server apparatus 10. The server apparatus 10 includes a communication device 46, an utterance acquisition device 48, a parking difficulty level deriving device 50, a skill calculating device 52, a map information holding device 54, a parking lot information holding device 56, and a driver information holding device 58.

The communication device 46 receives vehicle information and sound information from the terminal apparatus 12, and when there is a request of a parking-lot search from the terminal apparatus 12, the communication device 46 transmits parking lot information to the terminal apparatus 12. The vehicle information includes a terminal ID of the terminal apparatus 12, vehicle state information, positional information of the terminal apparatus 12, and attribute information of the vehicle. Note that the server apparatus 10 may have the attribute information of the vehicle. For example, the driver information holding device 58 of the server apparatus 10 may hold the terminal ID of the terminal apparatus 12 and the attribute information in an associated manner.

The skill calculating device 52 calculates a parking skill value of a driver based on the vehicle state information and positional information of the vehicle and stores the parking skill value thus calculated in the driver information holding device 58. The skill calculating device 52 calculates the number of turnabout maneuvers of the vehicle in a parking lot based on the vehicle state information and calculates the parking skill value of the driver based on a difference between the number of turnabout maneuvers of the vehicle and an average number of turnabout maneuvers in the parking lot. The skill calculating device 52 determines, as one turnabout maneuver of the vehicle, each of a case where the position of the shift lever is moved from the forward position to the reverse position and then returned to the forward position and a case where the position of the shift lever is moved from the reverse position to the forward position and then returned to the reverse position. The skill calculating device 52 stores, in the driver information holding device 58, the calculated parking skill value and the number of turnabout maneuvers associated with the parking lot.

The utterance acquisition device 48 acquires information on utterances of drivers of a plurality of vehicles about the parking lot. The utterance acquisition device 48 receives, from the communication device 46, sound information and positional information of a vehicle at the time when the sound information is recorded. Further, the utterance acquisition device 48 receives map information of the map information holding device 54 and parking lot positional information of the parking lot information holding device 56. The utterance acquisition device 48 extracts utterances of the drivers about the parking lot at the time when their vehicles are placed in the parking lot or around the parking lot.

The utterance acquisition device 48 extracts utterances of occupants from the sound information. Further, the utterance acquisition device 48 takes out, from the utterances thus extracted, an utterance related to the parking lot and recorded in the parking lot or around the parking lot. In this case, the utterance acquisition device 48 takes out the utterance recorded when the positional information of the vehicle is within a predetermined range from the parking lot. For example, the predetermine range may be within 20 meters from the parking lot.

The utterance acquisition device 48 takes out utterances made not only in the parking lot but also around the parking lot as evaluation targets. Accordingly, even when a user cannot park the vehicle at the parking lot, it is possible to take out a useful utterance to evaluate the parking lot. Note that the utterance acquisition device 48 may take an utterance, about the parking lot, that is made only in the parking lot as an evaluation target for the parking lot.

The utterance acquisition device 48 may take out an utterance recorded when positional information of a vehicle is within the predetermined range from the parking lot and the vehicle runs at a predetermined vehicle speed or lower. Hereby, it is possible to take out an utterance of an occupant when the vehicle speed is lowered to park the vehicle. Note that a process of extracting an utterance from the sound information may be executed by the terminal apparatus 12, and in that case, the utterance acquisition device 48 acquires information on the utterance extracted by the terminal apparatus 12.

The utterance about the parking lot, taken out by the utterance acquisition device 48, is stored in association with attribute information of a vehicle driven by a driver who made the utterance. Hereby, the parking difficulty level can be derived with accuracy in consideration of the attribute information, namely, the size of the vehicle.

The parking difficulty level deriving device 50 derives a parking difficulty level at the parking lot based on the information on the utterance about the parking lot, acquired by the utterance acquisition device 48. The parking difficulty level deriving device 50 categorizes whether the information on the utterance of the driver about the parking lot is negative or positive. For example, utterances such as "it is hard to park," "it seems hard to leave the parking lot even if this car is parked," and "the parking lot is too narrow for this car" are categorized as negative, and utterances such as "the parking lot is wide" and "the parking lot is always unoccupied" are categorized as positive. The parking difficulty level is derived as a value that indicates a higher parking difficulty as the value is larger. The parking difficulty level is derived such that the parking difficulty level is decreased by a positive utterance and the parking difficulty level is increased by a negative utterance. The parking difficulty level deriving device 50 adjusts the value of the parking difficulty level based on the information on the utterance about the parking lot. By deriving the parking difficulty level from an utterance of a driver, the parking lot can be evaluated based on the subjective of the driver that is not reflected on drive data. For example, assume a case where, although a driver says that it is hard to park, the driver can park well by chance by carefully steering the steering wheel. Even in such a case, the parking lot can be evaluated based on the subjective of the driver.

The parking difficulty level deriving device 50 acquires vehicle state information via the communication device 46 and uses, for derivation of the parking difficulty level, not only the utterance about the parking lot but also the number of turnabout maneuvers of the vehicle at the time of parking. Since the parking difficulty level is derived from the utterance about the parking lot and the number of turnabout maneuvers at the time of parking, the parking difficulty level can be derived based on the utterance on which the subjective of the driver is reflected and a driving result. The parking difficulty level deriving device 50 stores the parking difficulty level thus derived in the parking lot information holding device 56 and updates an average number of turnabout maneuvers in the parking lot. The parking difficulty level deriving device 50 also stores, in the driver information holding device 58, the number of turnabout maneuvers of the driver associated with the terminal ID of the terminal apparatus 12.

The parking difficulty level deriving device 50 may derive the parking difficulty level based on information on a categorized utterance about the parking lot and attribute information. For example, in a case where the attribute information indicates that a vehicle is large, even when a driver of the vehicle makes a negative utterance such as "it is hard to park," the parking difficulty level deriving device 50 prevents the parking difficulty level from easily increasing in comparison with a case of a small vehicle. Hereby, the vehicle size can be reflected on the parking difficulty level.

The parking difficulty level deriving device 50 may derive the parking difficulty level based on information on an utterance about the parking lot and the parking skill value of a driver. For example, in a case where the parking skill value of the driver indicates that the driver is not good at parking, even when the driver of the vehicle makes a negative utterance such as "it is hard to park," the parking difficulty level deriving device 50 prevents the parking difficulty level from easily increasing in comparison with a case of an utterance of a driver who is good at parking. Hereby, a personal parking skill value can be reflected on the parking difficulty level.

The parking lot information holding device 56 holds parking lot positional information to specify a parking lot, the parking difficulty level derived by the parking difficulty level deriving device 50, and the average number of turnabout maneuvers at the time of parking. The parking lot information holding device 56 associates the parking lot positional information, the parking difficulty level, and the average number of turnabout maneuvers with a parking lot ID so as to hold these pieces of information per parking lot.

The driver information holding device 58 holds the parking skill value calculated by the skill calculating device 52, the number of turnabout maneuvers at the time of parking, the number being associated with the parking lot ID, the attribute information of the vehicle, and language data indicative of utterance information about the parking lot. These pieces of information are held in association with the terminal ID. The language data indicative of utterance information about the parking lot may be associated with not the positional information, but with the parking lot ID. Those pieces of information held in the driver information holding device 58 are associated with each other by the terminal ID.

FIG. 4 is a flow chart to describe a process of deriving a parking difficulty level based on an utterance of a driver. The utterance acquisition device 48 of the server apparatus 10 extracts an utterance of a driver from sound information received from a plurality of vehicles (S10), and determines whether the utterance is recorded within the predetermined range from the parking lot based on positional information of a vehicle of the driver and positional information of the parking lot or based on either one of these pieces of positional information (S12).

When the utterance of the driver is recorded out of the predetermined range from the parking lot (N in S12), the utterance is discarded, and the process is finished. When the utterance of the driver is recorded within the predetermined range from the parking lot (Y in S12), the utterance acquisition device 48 takes out the utterance, and the parking difficulty level deriving device 50 analyzes the utterance thus taken out about the parking lot (S14). Hereby, an utterance made when a driver looks at the parking lot and avoids the parking lot can be taken out.

The parking difficulty level deriving device 50 categorizes the utterance. When the utterance is a positive utterance (Y in S16), that is, when the utterance is an utterance indicating that it is easy to park at the parking lot, the parking difficulty level deriving device 50 decreases the parking difficulty level (S18), so that the parking difficulty level is adjusted to indicate that it is easy to park. Further, in a case where the utterance is not a positive utterance (N in S16), the parking difficulty level deriving device 50 increases the parking difficulty level (S20), so that the parking difficulty level is adjusted to indicate that it is hard to park.

Note that the embodiment is just an example, and it is understandable for a person skilled in the art that the disclosure can be performed with various modifications by combining various constituents and such modifications are also within the scope of the disclosure.

What is claimed is:

1. A parking lot evaluation apparatus related to a vehicle that a driver drives, the parking lot evaluation apparatus comprising:
    an acquisition device configured to acquire utterance information that is information on an utterance made by the driver about a parking lot in the vehicle, the acquisition device being configured to acquire, as an utterance about the parking lot, an utterance of the driver about the parking lot at a time when the vehicle is placed in the parking lot or around the parking lot; and
    a deriving device configured to derive a parking difficulty level indicative of parking difficulty at the parking lot, based on the acquired utterance information about the parking lot.

2. The parking lot evaluation apparatus according to claim 1, wherein
    the acquisition device is configured to store the utterance of the driver about the parking lot in association with attribute information of the vehicle that the driver drives, and
    the deriving device is configured to derive the parking difficulty level according to the attribute information of the vehicle.

3. The parking lot evaluation apparatus according to claim 1, wherein
    the deriving device is configured to categorize whether the utterance information of the driver about the parking lot is negative or positive, and
    the deriving device is configured to derive the parking difficulty level based on the categorized utterance information about the parking lot.

4. The parking lot evaluation apparatus according to claim 1, further comprising a skill calculating device configured to calculate a parking skill value of the driver based on vehicle state information including a driving operation history in the parking lot, the driving operation history being detected when the vehicle is parked, wherein the deriving device is configured to derive the parking difficulty level based on the utterance information of the driver about the parking lot and the parking skill value of the driver.

5. A parking lot information supply method to a driver of a vehicle, the parking lot information supply method comprising:

acquiring utterance information about a parking lot among utterances made in the vehicle at the parking lot and information to specify the parking lot; and providing parking lot information derived based on the utterance information when the vehicle is guided to the parking lot.

6. The parking lot information supply method according to claim 5, further comprising deriving a parking difficulty level indicative of parking difficulty at the parking lot, based on the acquired utterance information about the parking lot, wherein the parking lot information is information indicative of the parking difficulty level, the parking lot information is provided when the driver performs a parking-lot search, and the utterance information is an utterance made by the driver about the parking lot at a time when the vehicle is placed in the parking lot or around the parking lot.

7. The parking lot information supply method according to claim 5, further comprising, before the acquiring of the utterance information and the information to specify the parking lot, outputting audio to promote the driver to make an utterance about the parking lot at a time of parking.

8. The parking lot information supply method according to claim 5, further comprising outputting audio to promote the driver to make an utterance about the parking lot, in a time period from a time at which parking is finished to a time at which a power source of the vehicle is turned off.

9. A data structure of parking lot information for a parking lot evaluation apparatus related to a vehicle that a driver drives, the data structure comprising:

information to specify a parking lot;

language data associated with the information to specify the parking lot, wherein the language data indicates utterance information about the parking lot among utterances made in the vehicle and acquired in the parking lot or around the parking lot, the information to specify the parking lot and the language data are used for the parking lot evaluation apparatus to perform a process of deriving a parking difficulty level, the parking difficulty level is derived based on the utterance information about the parking lot and indicative of parking difficulty at the parking lot.

10. The data structure according to claim 9, further comprising attribute information of the vehicle associated with the utterance information, the attribute information of the vehicle is used for the parking lot evaluation apparatus to perform a process of deriving the parking difficulty level based on the utterance information about the parking lot and the attribute information of the vehicle.

11. The data structure according to claim 9, further comprising vehicle state information including a driving operation history of the vehicle in the parking lot, the vehicle state information is used for the parking lot evaluation apparatus to perform a process of calculating a parking skill value of the driver based on the vehicle state information and deriving the parking difficulty level based on the utterance information of the driver about the parking lot and the parking skill value of the driver.

* * * * *